(12) United States Patent
Zhong et al.

(10) Patent No.: US 12,059,119 B2
(45) Date of Patent: Aug. 13, 2024

(54) AIR HANDLING ASSEMBLY AND CLEANING APPARATUS HAVING SAME

(71) Applicant: JIANGSU MIDEA CLEANING APPLIANCES CO., LTD., Suzhou (CN)

(72) Inventors: Min Zhong, Suzhou (CN); Xuebing Yin, Suzhou (CN); Dong Li, Suzhou (CN); Yuanfu Xu, Suzhou (CN)

(73) Assignee: JIANGSU MIDEA CLEANING APPLIANCES CO., LTD., Suzhou (CN)

( * ) Notice: Subject to any disclaimer, the term of this patent is extended or adjusted under 35 U.S.C. 154(b) by 391 days.

(21) Appl. No.: 17/442,114

(22) PCT Filed: Mar. 5, 2020

(86) PCT No.: PCT/CN2020/078046
§ 371 (c)(1),
(2) Date: Sep. 22, 2021

(87) PCT Pub. No.: WO2020/192386
PCT Pub. Date: Oct. 1, 2020

(65) Prior Publication Data
US 2022/0160198 A1  May 26, 2022

(30) Foreign Application Priority Data
Mar. 26, 2019  (CN) .......................... 201910233848.1

(51) Int. Cl.
*A47L 9/16* (2006.01)
*A47L 5/24* (2006.01)
(Continued)

(52) U.S. Cl.
CPC ............... *A47L 9/1608* (2013.01); *A47L 5/24* (2013.01); *A47L 9/1666* (2013.01);
(Continued)

(58) Field of Classification Search
None
See application file for complete search history.

(56) References Cited

U.S. PATENT DOCUMENTS

2014/0237757 A1* 8/2014 Conrad ................. A47L 9/1608
15/353

FOREIGN PATENT DOCUMENTS

| CN | 101617926 A | 1/2010 |
| CN | 105307552 A | 2/2016 |

(Continued)

OTHER PUBLICATIONS

Search Report for EP application 20779285.4.
First OA for CN application 201910233848.1.
ISR for PCT application PCT/CN2020/078046.

*Primary Examiner* — Abbie E Quann

(57) ABSTRACT

An air handling assembly and a cleaning apparatus having same are provided. The air handling assembly includes: a cyclonic chamber, a cyclonic cone, a dust collection chamber and an exhaust chamber. The cyclonic chamber has a dirty air inlet, a clean air outlet and a dust fall opening. The cyclonic cone is arranged inside the cyclonic chamber, an air exit of the cyclonic cone is arranged away from the dust fall opening, and an end of the cyclonic cone close to the dust fall opening is spaced apart from an end of the cyclonic chamber at which the dust fall opening is arranged.

14 Claims, 8 Drawing Sheets

(51) Int. Cl.
    *B04C 3/06* (2006.01)
    *B04C 9/00* (2006.01)
(52) U.S. Cl.
    CPC .............. *A47L 9/1683* (2013.01); *B04C 3/06* (2013.01); *B04C 9/00* (2013.01); B04C 2009/002 (2013.01)

(56) References Cited

FOREIGN PATENT DOCUMENTS

| | | |
|---|---|---|
| CN | 106377204 A | 2/2017 |
| CN | 106388706 A | 2/2017 |
| CN | 107072453 A | 8/2017 |
| CN | 107205607 A | 9/2017 |
| CN | 206934050 U | 1/2018 |
| CN | 107997676 A | 5/2018 |
| CN | 108272385 A | 7/2018 |
| CN | 108463151 A | 8/2018 |
| CN | 108606716 A | 10/2018 |
| CN | 109124461 A | 1/2019 |
| EP | 2961305 A1 | 1/2016 |
| WO | 2015123538 A1 | 8/2015 |
| WO | 2018152835 A1 | 8/2018 |

\* cited by examiner

Front ——————— Rear (transverse)

Front

Rear (transverse)

AIR HANDLING ASSEMBLY AND CLEANING APPARATUS HAVING SAME

CROSS-REFERENCES TO RELATED APPLICATIONS

The present disclosure is a national phase application of International Application No. PCT/CN2020/078046, filed on Mar. 5, 2020, which claims priority to Chinese Patent Application No. 201910233848.1, filed on Mar. 26, 2019, the entireties of which are herein incorporated by reference.

FIELD

This application relates to the field of cleaning equipment, and more particularly, to an air handling assembly and a cleaning apparatus having same.

BACKGROUND

A cleaning apparatus usually has an air handling assembly and a suction device. During operation of the suction device, air outside the cleaning apparatus can enter the air handling assembly for dust-air separation, so that separated dirt can be stored in the air handling assembly, and separated air can flow to the suction device and then be discharged outside the cleaning apparatus. Some air handling assemblies in the related art are provided with cyclonic cones, and during dust-air separation of the air handling assemblies, hair or fur tends to get entangled around the cyclonic cones, which may be difficult to clean and cause trouble to users.

SUMMARY

The present disclosure aims to at least solve one of the problems in the related art. Accordingly, the present disclosure proposes an air handling assembly that can prevent hair and fur from being entangled around cyclonic cones and facilitate cleaning of the hair and fur entangled around the cyclonic cones.

The present disclosure also proposes a cleaning apparatus having the above air handling assembly.

The air handling assembly according to embodiments of the present disclosure includes: a cyclonic chamber having two axial ends as a first end and a second end, and having a clean air outlet on an end face of the first end, a dust fall opening at the second end, and a dirty air inlet between the clean air outlet and the dust fall opening; a cyclonic cone arranged in the cyclonic chamber and having two axial ends as a third end and a fourth end, the third end and the fourth end being arranged sequentially along a direction from the first end to the second end, the cyclonic cone having an airflow passage within the cyclonic cone and an air intake of the airflow passage on a side wall of the cyclonic cone, the third end being coupled to the first end and communicating the airflow passage with the clean air outlet, and the fourth end being closed and spaced apart from the second end; a dust collection chamber located outside the cyclonic chamber and being in communication with the dust fall opening; and an exhaust chamber located outside the cyclonic chamber and being in communication with the clean air outlet, the exhaust chamber being isolated from the dust collection chamber.

The air handling assembly according to the present disclosure is conductive to preventing hair and fur from being entangled around the cyclonic cone and facilitates cleaning of the hair and fur entangled around the cyclonic cone.

In some embodiments, an axis of the cyclonic chamber extends transversely and the exhaust chamber extends transversely; the exhaust chamber has an inlet extending to the first end and an outlet extending to the second end.

In some embodiments, the air handling assembly further includes: a connection chamber arranged outside the cyclonic chamber and away from the second end, and connected between the clean air outlet of the cyclonic chamber and the inlet of the exhaust chamber.

In some embodiments, the dirty air inlet is located on a top side of the cyclonic chamber; the dust fall opening is located on a bottom side of the cyclonic chamber; and the dirty air inlet and the dust fall opening are located on two sides of a vertical plane passing through the axis of the cyclonic chamber.

In some embodiments, the air handling assembly further includes an outer drum and an inner drum. The outer drum includes: an outer drum shell arranged transversely and opened at both transverse ends; and an outer drum lid arranged at one of the transverse ends of the outer drum shell. The clean air outlet and the inlet of the exhaust chamber are formed on the outer drum lid, and the outer drum shell has a suction port in communication with the dirty air inlet. The inner drum includes: an inner drum shell arranged transversely and inside the outer drum shell, and opened at both transverse ends; and an inner drum lid arranged at one, away from the outer drum lid, of the transverse ends of the inner drum shell. The cyclonic chamber and the exhaust chamber are both formed inside the inner drum shell; the dust collection chamber is formed between an inner surface of the outer drum and an outer surface of the inner drum and located below the exhaust chamber; the dirty air inlet is formed on the inner drum shell and close to the outer drum lid; the dust fall opening is formed on the inner drum shell and close to the inner drum lid.

In some embodiments, the inner surface of the outer drum shell has a support rib extending transversely, and the outer surface of the inner drum shell has a lapping rib lapping over the support rib.

In some embodiments, the support rib and the lapping rib lap over each other in a sealing manner and form a sealing surface, and the dust collection chamber is located below the sealing surface.

In some embodiments, the air handling assembly further includes: an end cap arranged outside the outer drum and on a side of the outer drum lid away from the outer drum shell, the end cap and the outer drum lid defining a connection chamber connected between the clean air outlet and the exhaust chamber.

In some embodiments, the inner drum shell includes: a shell portion, the cyclonic chamber being formed within the shell portion, and the dirty air inlet being formed on the shell portion; a cover portion arranged outside the shell portion, the exhaust chamber being formed between an inner surface of the cover portion and an outer surface of the shell portion; and a tube portion arranged outside the shell portion and having two ends in communication with the suction port and the dirty air inlet.

In some embodiments, cover portions are arranged, and the tube portion penetrates one of the cover portions.

In some embodiments, the outer drum lid has a mounting portion extending towards an interior of the inner drum shell, and the cyclonic cone is fitted over the mounting portion.

In some embodiments, the air handling assembly further includes: a first seal sealed between the inner drum shell and the outer drum lid; and/or a second seal sealed between the outer drum shell and the inner drum lid.

The cleaning apparatus according to embodiments of the present disclosure includes: a body assembly including a casing and a suction device arranged within the casing; and the air handling assembly according to embodiments of the present disclosure, arranged on the casing and fluidly connected upstream the suction device.

The cleaning apparatus facilitates cleaning since it is provided with the air handling assembly according to embodiments.

In some embodiments, the cleaning apparatus is a handheld dust collector, and the body assembly further includes a handle for holding.

In some embodiments, the cleaning apparatus further includes: a pre-filter assembly fluidly connected between the suction device and the air handling assembly. An axis of the cyclonic chamber extends transversely, and the pre-filter assembly is arranged above the air handling assembly.

Embodiments of the present disclosure will be given in part in the following descriptions, become apparent in part from the following descriptions, or be learned from the practice of the embodiments of the present disclosure.

Figure 1:
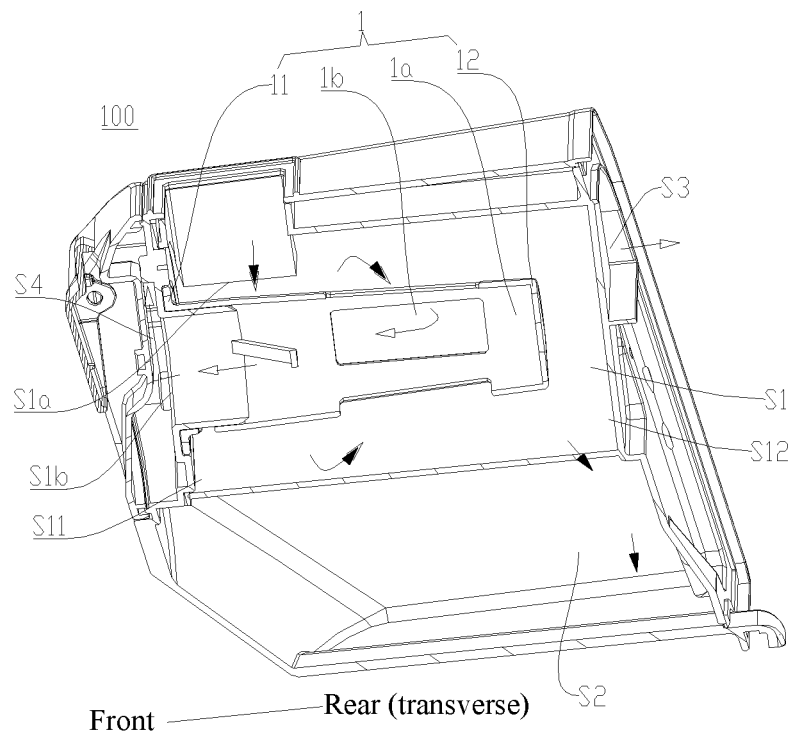
FIG. 1 is a sectional view of an air handling assembly according to an embodiment of the present disclosure.

REFERENCE NUMERALS air handling assembly 100;
cyclonic chamber S1; first end S11; second end S12;
dirty air inlet S1a; clean air outlet S1b; dust fall opening S1c;
dust collection chamber S2; exhaust chamber S3; inlet S31; outlet S32;
connection chamber S4; temporary storage chamber S5;
cyclonic cone 1; third end 11; fourth end 12;
airflow passage 1a; air intake 1b; air exit 1c;
outer drum 2; outer drum shell 21; suction port 211; support rib 212;
outer drum lid 22; mounting portion 221;
inner drum 3; inner drum shell 31; shell portion 311; cover portion 312; tube portion 313; lapping rib 314; sealing surface A;
inner drum lid 32;
end cap 4; first seal 5; second seal 6; mounting clasp 7;
body assembly 200; casing 201; suction device 202; handle 203;
switch control assembly 204; exhaust air filter device 205; suction tube device 206;
pre-filter assembly 300; entrance 301; cleaning apparatus 1000.

DETAILED DESCRIPTION OF THE DISCLOSURE

Embodiments of the present disclosure will be described in detail below, and examples of the embodiments will be shown in the accompanying drawings. The same or similar elements and the elements having same or similar functions are denoted by like reference numerals throughout the descriptions. The embodiments described below are exemplary and are intended to explain the present disclosure rather than limit the present disclosure.

A number of different embodiments or examples for implementing different structures of the present disclosure are provided below. In order to simplify the description, components and settings of particular examples will be described below. They are merely examples and are not intended to limit the present disclosure. Furthermore, reference numerals and/or letters can be repeated in different examples. Such repetition is for simplicity and clarity and is not intended to indicate relationship of the various embodiments and/or settings discussed. In addition, various examples of specific processes and materials are provided in the present disclosure, but applicability of other processes and/or use of other materials.

An air handling assembly 100 according to embodiments of the present disclosure will be described below with reference to FIGS. 1-12.

As shown in FIG. 1, the air handling assembly 100 may include: a cyclonic chamber S1, a cyclonic cone 1, a dust collection chamber S2, and an exhaust chamber S3. Two axial ends of the cyclonic chamber S1 are denoted as a first end S11 and a second end S12. The cyclonic chamber S1 has a dirty air inlet S1a, a clean air outlet S1b, and a dust fall opening S1c (in conjunction with FIG. 8); the clean air outlet S1b is arranged on an end face of the first end S11; the dust fall opening S1c is arranged at the second end S12 (i.e., on an end face of the second end S12 or on a side wall close to the end face of the second end S12); the dirty air inlet S1a is located between the clean air outlet S1b and the dust fall opening S1c (i.e., the dirty air inlet S1a is located between the first end S11 and the second end S12 of the cyclonic chamber S1). The cyclonic cone 1 is located in the cyclonic chamber S1. Two axial ends of the cyclonic cone 1 are denoted as a third end 11 and a fourth end 12, and the third end 11 and the fourth end 12 are arranged in sequence along a direction from the first end S11 to the second end S12.

It is noted here that the dirty air inlet S1a extends in a tangential direction of the cyclonic chamber S1, so that dirty air can enter the cyclonic chamber S1 in the tangential direction and realizes cyclonic flow. In addition, it should be noted that an axial direction of the cyclonic chamber S1 refers to an extension direction of an axis around which air entering the cyclonic chamber S1 performs cyclonic flow. Moreover, it should be noted that the cyclonic cone 1 is cone-shaped or truncated cone-shaped, so that an axial direction of the cyclonic cone 1 refers to an extension direction of an axis of the cone or truncated cone constructed into the cyclonic cone 1.

Figure 4:
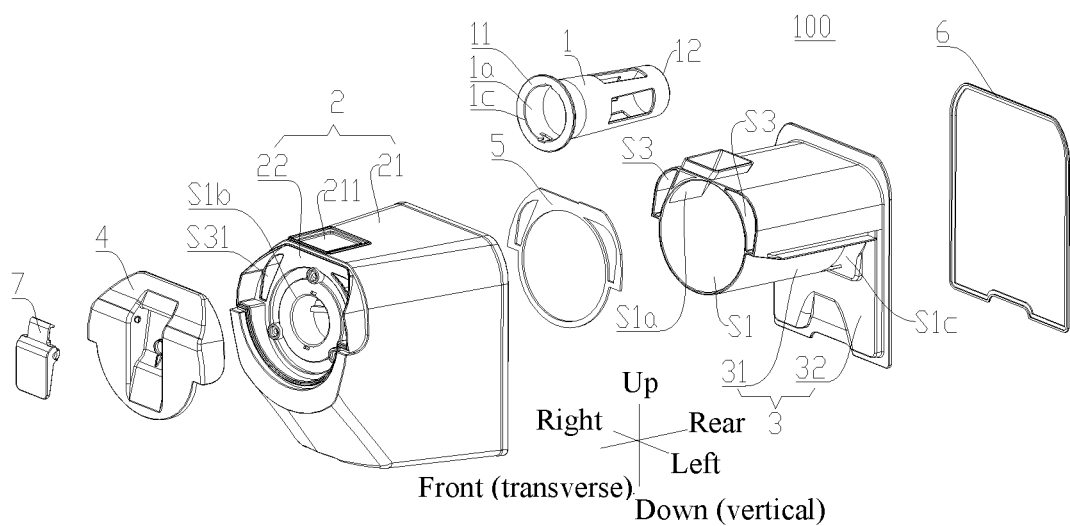
FIG. 4 is an exploded view of the air handling assembly shown in FIG. 1.

As shown in FIG. 1, the cyclonic cone 1 has an airflow passage 1a in the cone, and has an air intake 1b of the airflow passage 1a on a side wall of the cyclonic cone 1 and an air exit 1c of the airflow passage 1a on the third end 11 (in conjunction with FIG. 4). The third end 11 is coupled to the first end S11 so that the airflow passage 1a is in communication with the clean air outlet S1b, and airflow flowing towards the air exit 1c can be discharged through the clean air outlet S1b.

The fourth end 12 is closed and spaced apart from the second end S12. That is, a distance from the third end 11 to the fourth end 12 is less than a distance from the first end S11 to the second end S12, so that when the third end 11 is coupled to the first end S11, there is a clearance distance between the fourth end 12 and the second end S12. In conjunction with FIG. 15, the dust collection chamber S2 is located outside the cyclonic chamber S1 and is in communication with the dust fall opening S1c; the exhaust chamber S3 is located outside the cyclonic chamber S1 and is in communication with the clean air outlet S1b, and the exhaust chamber S3 is isolated from the dust collection chamber S2.

In this way, during the use of the air handling assembly 100, the airflow can enter the cyclonic chamber S1 through the dirty air inlet S1a and undergo cyclonic separation around the cyclonic cone 1. Dirt in the airflow is thrown onto an inner wall of the cyclonic chamber S1 by centrifugal force, and enters the dust collection chamber S2 through the dust fall opening S1c to be collected. Air separated from the dirt can enter the airflow passage 1a in the cyclonic cone 1 through the air intake 1b, flow towards the air exit 1c, then is discharged from the clean air outlet S1b into the exhaust chamber S3, and afterwards can flow through the exhaust chamber S3 to a suction device 202 of a cleaning apparatus 1000.

Thus, for the air handling assembly 100 according to the embodiments of the present disclosure, the dust fall opening S1c and the clean air outlet S1b are distributed on both axial sides of the cyclonic chamber S1; the cyclonic cone 1 is provided with the air exit 1c at an end (i.e., the third end 11) away from the dust fall opening S1c; and the cyclonic cone 1 is closed at an end (i.e., the fourth end 12) close to the dust fall opening S1c and spaced at a distance from the second end S12, so that when the dirt in the cyclonic chamber S1 flows into the dust fall opening S1c, hair or fur in the dirt can enter the dust fall opening S1c through a gap between the fourth end 12 of the cyclonic cone 1 and the second end S12 of the cyclonic chamber S1, instead of being entangled around the fourth end 12 of the cyclonic cone 1 and, moreover, even if there is hair or fur entangled around the fourth end 12 of the cyclonic cone 1, users can remove the hair or fur from the fourth end 12 easily and directly, which is very convenient to clean.

On the contrary, if the fourth end 12 of the cyclonic cone 1 is coupled to the second end S12 of the cyclonic chamber S1 (i.e., not spaced apart), the hair or fur in the dirt may easily get entangled around the fourth end 12 of the cyclonic cone 1 when the dirt from the cyclonic chamber S1 flows into the dust fall opening S1c, and after the hair or fur is entangled around the fourth end 12 of the cyclonic cone 1, the users have to gently remove the hair or fur entangled around the fourth end 12 along a direction from the fourth end 12 to the third end 12, which is inconvenient and time-consuming.

Thus, for the air handling assembly 100 according to the embodiments of the present disclosure, the air exit 1c of the cyclonic cone 1 is arranged away from the dust fall opening S1c, and the end of the cyclonic cone 1 close to the dust fall opening S1c is spaced apart from the end of the cyclonic chamber S1 where the dust fall opening S1c is arranged, so that the hair or fur can be prevented from being entangled around the cyclonic cone 1, and can be easily cleared away even if entangled around the cyclonic cone 1.

Figure 2:
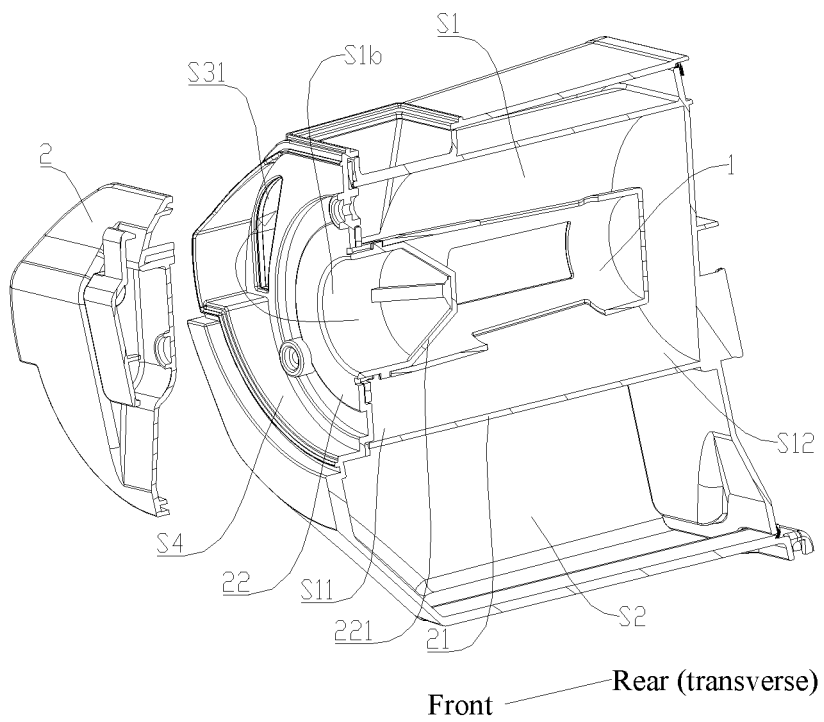
FIG. 2 is another exploded sectional view of the air handling assembly shown in FIG. 1.
Figure 3:
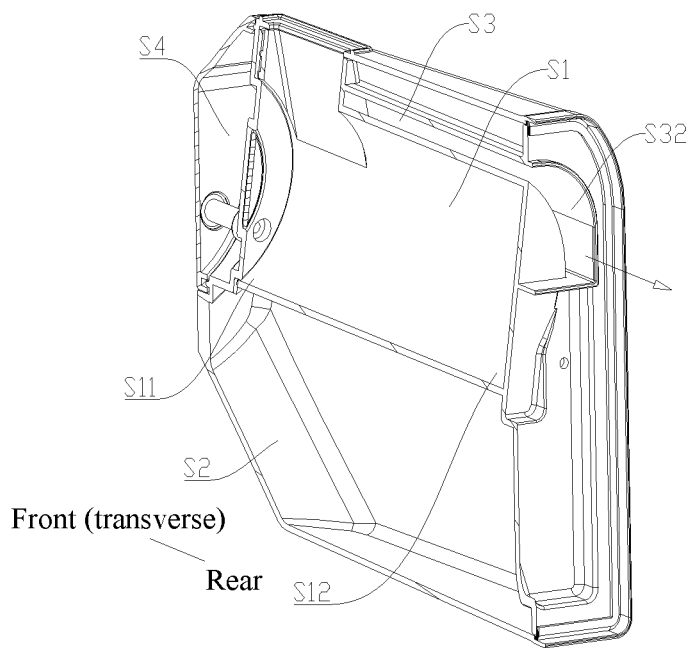
FIG. 3 is another sectional view of the air handling assembly shown in FIG. 1.

In some embodiments of the present disclosure, as shown in FIGS. 1-3, the axis of the cyclonic chamber S1 may extend in a transverse direction and the exhaust chamber S3 may also extend in a transverse direction. That is, a length direction of the exhaust chamber S3 is regarded as the transverse direction, and a direction of the axis of the cyclonic chamber S1 may be parallel, or not parallel (e.g. slightly angled) with the length direction of the exhaust chamber S3. It should be noted that the transverse direction described herein refers to a horizontal or substantially horizontal direction, such as a front-rear direction shown in the drawings, and that all directions described herein refer to directions in which the air handling assembly 100 is usually presented during use.

As shown in FIGS. 1-3, an inlet S31 of the exhaust chamber S3 may extend to the first end S11, and an outlet S32 of the exhaust chamber S3 may extend to the second end S12, and the inlet S31 of the exhaust chamber S3 is arranged close to a side of the clean air outlet S1b of the cyclonic chamber S1, and the outlet S32 of the exhaust chamber S3 is arranged close to a side of the dust fall opening S1c of the cyclonic chamber S1. As a result, the airflow entering the cyclonic chamber S1 can first move in a direction towards the dust fall opening S1c (a front-to-rear direction as shown in the drawings), enter the cyclonic cone 1, then move in a direction towards the clean air outlet S1b (a rear-to-front direction as shown in the drawings), enter the exhaust chamber S3 through the inlet S31 of the exhaust chamber S3, and move in a direction towards the outlet S32 of the exhaust chamber S3 (a front-to-rear direction as shown in the drawings).

Consequently, it can be ensured that the exhaust chamber S3 has a large volume, and exhaust noise is lowered; moreover, the exhaust chamber S3 does not affect an overall transverse length of the air handling assembly 100, i.e., the overall transverse length of the air handling assembly 100 may be substantially a transverse length of the cyclonic chamber S1, guaranteeing a small transverse dimension of the air handling assembly 100, so that when the air handling assembly 100 is used for handheld dust collectors, it can be ensured that the air handling assembly 100 produces a short resistance arm, allowing users to operate it with less effort.

In some embodiments of the present disclosure, as shown in FIGS. 1-3, the air handling assembly 100 may further include: a connection chamber S4 located outside the cyclonic chamber S1 and arranged away from the second end S12. The connection chamber S4 is connected between the clean air outlet S1b of the cyclonic chamber S1 and the inlet S31 of the exhaust chamber S3, and the airflow discharged from the clean air outlet S1b of the cyclonic chamber S1 can first enter the connection chamber S4, then flow through the connection chamber S4 to the inlet S31 of the exhaust chamber S3, and enter the exhaust chamber S3. Thus, by arranging the connection chamber S4 close to the clean air outlet S1b of the cyclonic chamber S1 and the inlet S31 of the exhaust chamber S3, it can be simply and effectively ensured that the clean air outlet S1b of the cyclonic chamber S1 is in communication with the inlet S31 of the exhaust chamber S3, to reduce the structural complexity and processing difficulty of the exhaust chamber S3 and the cyclonic chamber S1, increasing productivity, and to avoid use of any air guide tube, reducing production costs and assembly difficulties.

In some embodiments of the present disclosure, as shown in FIG. 4, the dirty air inlet S1a may be located on a top side of the cyclonic chamber S1; the dust fall opening S1c may be located on a bottom side of the cyclonic chamber S1; and the dirty air inlet S1a and the dust fall opening S1c may be located on two sides of a vertical plane passing through the axis of the cyclonic chamber S1 (in an example shown in FIG. 4, the dirty air inlet S1a may be arranged on a right side of the vertical plane while the dust fall opening Sic may be arranged on a left side of the vertical plane). Thus, it can be ensured that the airflow entering the cyclonic chamber S1 is fully subject to cyclonic separation, improving a dust-air separation effect, and the overall structural strength of the cyclonic chamber S1 can be improved, reducing deformation of the cyclonic chamber S1 and ensuring a reliable cyclonic effect.

In one embodiment, the air handling assembly 100 includes a housing, and the cyclonic chamber S1, the dust collection chamber S2, and the exhaust chamber S3 are defined in the housing. It should be noted that the structural form of the housing is not limited to examples given below.

Figure 5:
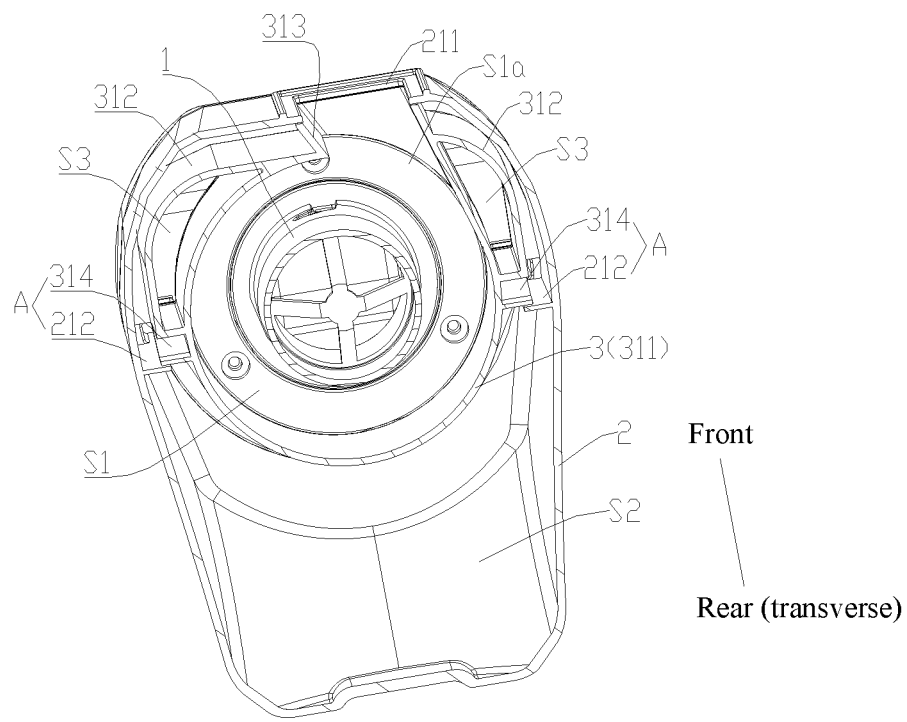
FIG. 5 is another sectional view of the air handling assembly shown in FIG. 1.

In some embodiments of the present disclosure, as shown in FIGS. 4 and 5, the housing of the air handling assembly 100 may include: an outer drum 2 and an inner drum 3. The outer drum 2 includes an outer drum shell 21 and an outer drum lid 22; the outer drum shell 21 is arranged transversely and is open at both transverse ends; the outer drum lid 22 is arranged at one of the transverse ends of the outer drum shell 21; the clean air outlet S1b and the inlet S31 of the exhaust chamber S3 are formed on the outer drum lid 22; and the outer drum shell 21 has a suction port 211 in communication with the dirty air inlet S1a. The inner drum 3 includes an inner drum shell 31 and an inner drum lid 32; the inner drum shell 31 is also arranged transversely and is open at both transverse ends; the inner drum shell 31 is located inside the outer drum shell 21; the inner drum lid 32 is located at one, away from the outer drum lid 22, of the transverse ends of the inner drum shell 31. The cyclonic chamber S1 and the exhaust chamber S3 are both formed inside the inner drum shell 31. The dust collection chamber S2 is formed between an inner surface of the outer drum 2 and an outer surface of the inner drum 3 and located below the exhaust chamber S3. The dirty air inlet S1a is formed on the inner drum shell 31 and arranged close to the outer drum lid 22. The dust fall opening S1c is formed on the inner drum shell 31 and arranged close to the inner drum lid 32.

Thus, one side of the outer drum lid 22 is the first end S11 of the cyclonic chamber S1 and one side of the inner drum lid 32 is the second end S12 of the cyclonic chamber S1, so that the inner drum shell 31 can be inserted into the outer drum shell 21 in a direction from the second end S12 to the first end S11, and the outer drum lid 22 and the inner drum lid 32 are on two transverse sides of the outer drum shell 21 and the inner drum shell 31. Hence, the air handling assembly 100 is simple in construction, easy to machine and assemble, and easy to clean; for example, the dust collection chamber S2 can be emptied and cleaned by pulling the inner drum shell 31 out of the outer drum shell 21 in a direction from the first end S11 to the second end S12.

Figure 6:
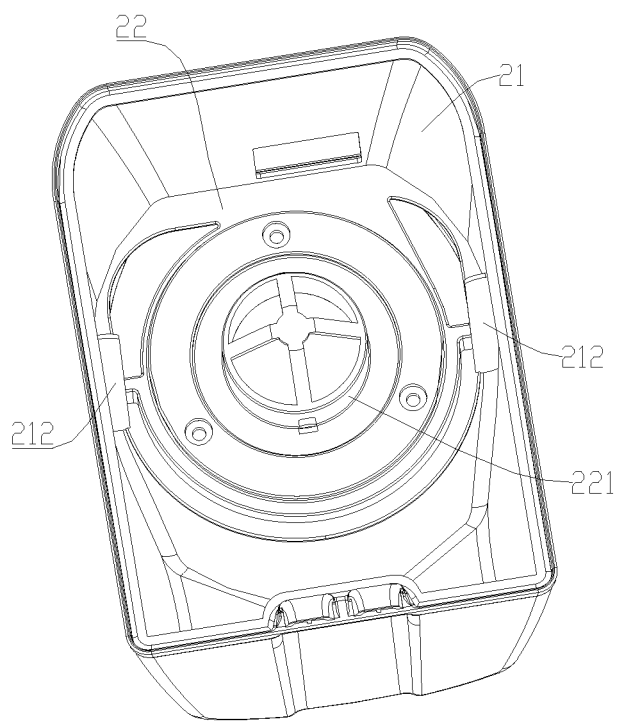
FIG. 6 is a perspective view of an outer drum shown in FIG. 4.

In some embodiments of the present disclosure, as shown in FIGS. 5 and 6, the outer drum lid 22 may have a mounting portion 221 extending towards an interior of the inner drum shell 31, and the cyclonic cone 1 is fitted over the mounting portion 221 (in conjunction with FIG. 2). Thus, the cyclonic cone 1 can be mounted simply and efficiently, and the cyclonic cone 1 mounted in this way is easy to clean. For example, when the inner drum shell 31 is withdrawn from the outer drum shell 21 in the direction from the first end S11 to the second end S12, users have access to the fourth end 12 of the cyclonic cone 1, and thus can easily remove hair or fur that may be entangled around the fourth end 12, which facilitates cleaning.

Figure 7:
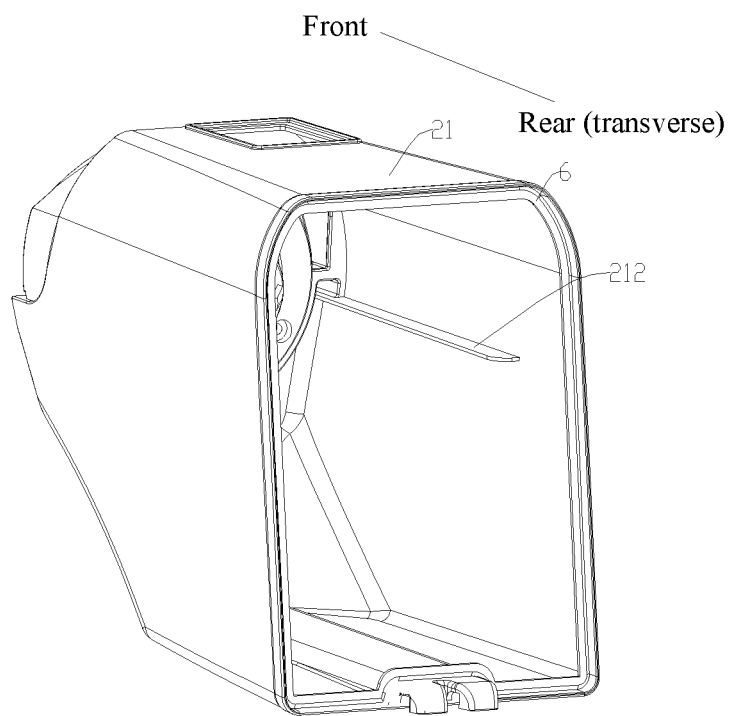
FIG. 7 is another perspective view of the outer drum shown in FIG. 4.
Figure 8:
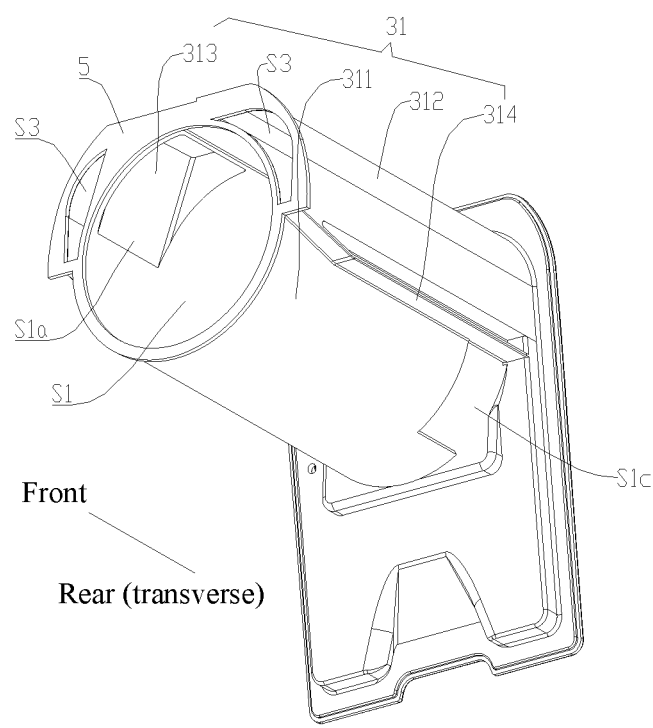
FIG. 8 is a view illustrating that the inner drum shown in FIG. 4 is assembled with a first seal.

In some embodiments of the present disclosure, as shown in FIGS. 7 and 8, the inner surface of the outer drum shell 21 may have a support rib 212 extending along the transverse direction, and the outer surface of the inner drum shell 31 has a lapping rib 314 which laps over the support rib 212 (in conjunction with FIG. 5). Hence, the inner drum 3 and the outer drum 2 can be assembled simply and efficiently, and the positioning reliability of the inner drum 3 can be improved. For example, during assembly, the lapping rib 314 may lap over the support rib 212, and then the inner drum shell 31 may be pushed into the outer drum shell 21 in the direction from the second end S12 to the first end S11.

In some embodiments of the present disclosure, as shown in FIG. 5, the support rib 212 and the lapping rib 314 that lap over each other in order to form a sealing surface A, and the dust collection chamber S2 is located below the sealing surface A. That is, with the support rib 212 and the lapping rib 314 fitted in place, the sealing surface A may be formed at a lap joint of the support rib 212 and the lapping rib 314, and the sealing surface A can close a top of the dust collection chamber S2 to limit a range of the dust collection chamber S2, which can facilitate cleaning of the dust collection chamber S2.

Figure 9:
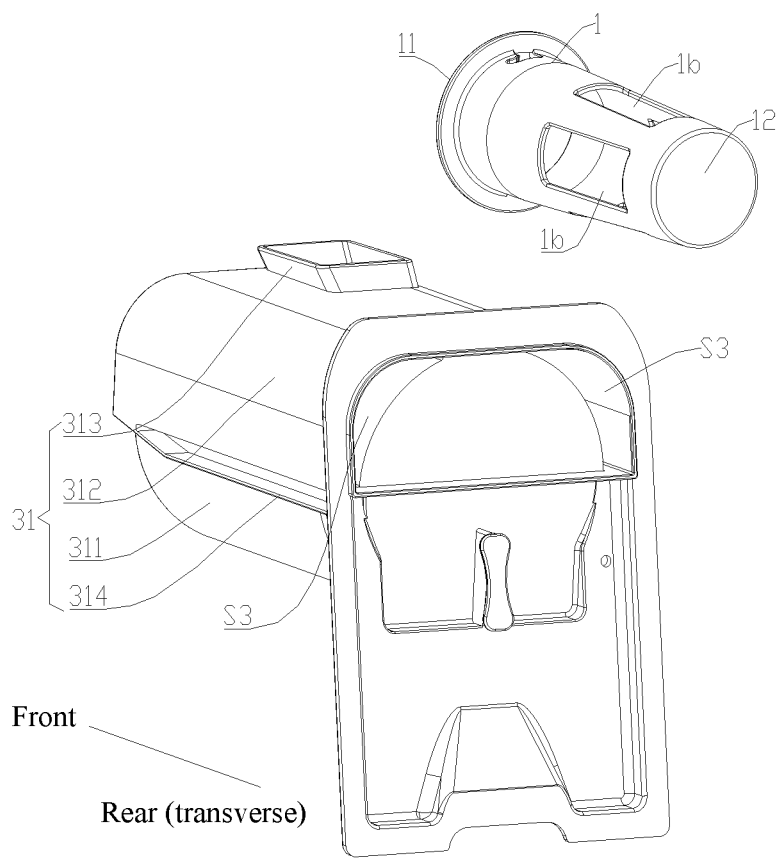
FIG. 9 is an exploded view of an inner drum and a cyclonic cone shown in FIG. 4.

In some embodiments of the present disclosure, as shown in FIGS. 8 and 9, the inner drum shell 31 may include: a shell portion 311, a cover portion 312, and a tube portion 313. The cyclonic chamber S1 is formed within the shell portion 311; the dirty air inlet S1a is formed on the shell portion 311; the cover portion 312 is arranged outside the shell portion 311; the exhaust chamber S3 is formed between an inner surface of the cover portion 312 and an outer surface of the shell portion 311; the tube portion 313 is arranged outside the shell portion 311 and has both ends in communication with the suction port 211 and the dirty air inlet S1a (in conjunction with FIG. 5). Hence, the inner drum shell 31 is simple in construction and easy to machine, and the cyclonic chamber S1 and the exhaust chamber S3 can be cleverly constructed, ensuring that the airflow can enter the cyclonic chamber S1 from the suction port 211 on the outer drum shell 21. As shown in FIG. 5, there may be cover portions 312, and the tube portion 313 may pass through one of the cover portions 312, which can ensure a sufficient volume of the exhaust chamber S3, and improve the compactness of the inner drum 3.

Figure 10:
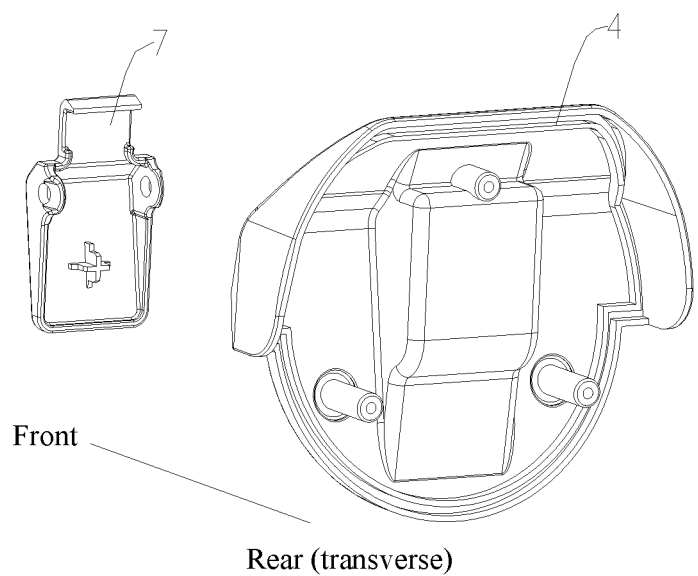
FIG. 10 is an exploded view of an end cap and a mounting clasp shown in FIG. 4.
Figure 11:
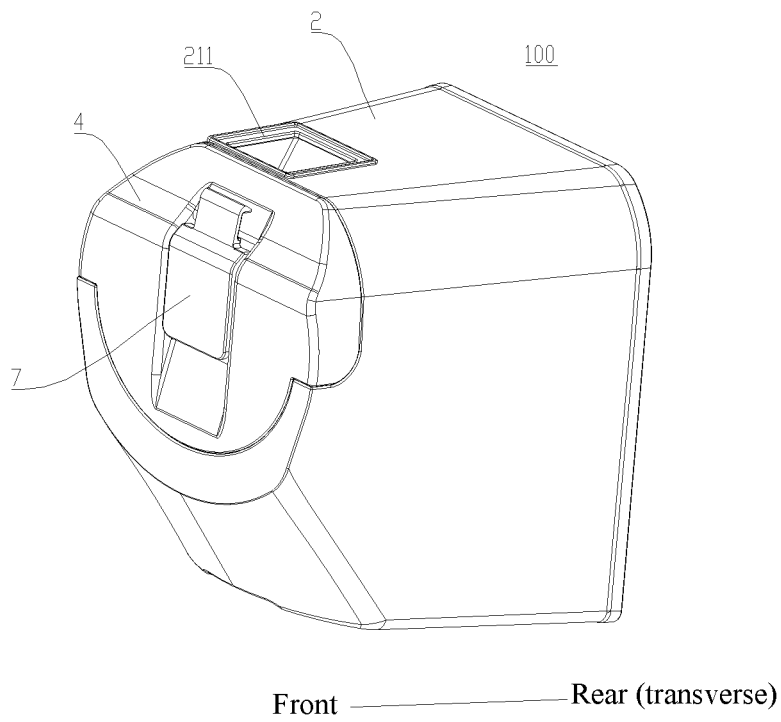
FIG. 11 is an assembly view of the air handling assembly shown in FIG. 4.
Figure 12:
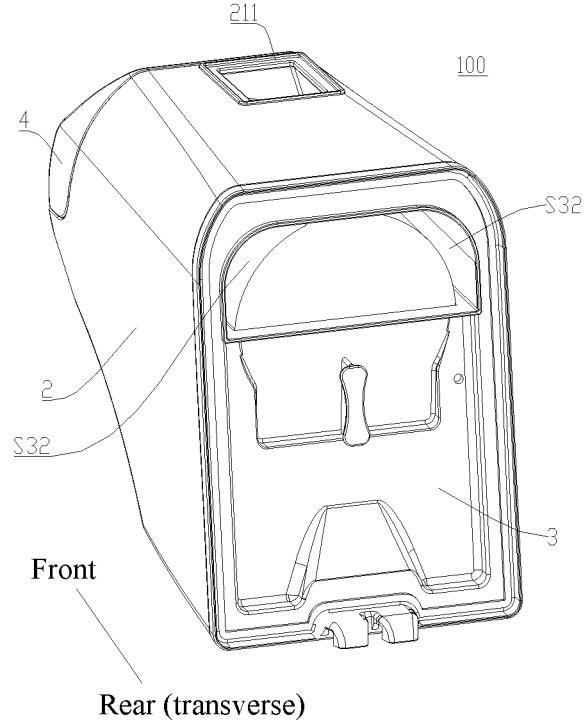
FIG. 12 is another assembly view of the air handling assembly shown in FIG. 4.

In some embodiments of the present disclosure, as shown in FIG. 10, the housing of the air handling assembly 100 may further include an end cap 4. In combination with FIGS. 2 and 4, the end cap 4 may be arranged outside the outer drum 2 and on a side of the outer drum lid 22 away from the outer drum shell 21. The connection chamber S4 is formed between the end cap 4 and the outer drum lid 22, and connected between the clean air outlet S1b and the exhaust chamber S3. Thus, the connection chamber S4 can be constructed in a simple and efficient manner, reducing the structural complexity and machining difficulty of the exhaust chamber S3 and the cyclonic chamber S1, increasing production efficiency, and avoiding use of any air guide tube to reduce production costs and assembly difficulties. Embodiment of the present disclosure are not limited thereto. In other embodiments of the present disclosure, the clean air outlet S1b of the cyclonic chamber S1 may be in communication with the exhaust chamber S3 in other ways, for example by air guide tubes, which will not be elaborated here.

In some embodiments of the present disclosure, as shown in FIG. 4, the air handling assembly 100 may further include at least one of a first seal 5 and a second seal 6; the first seal 5 is sealed between the inner drum shell 31 and the outer drum lid 22 (in conjunction with FIG. 8); and the second seal 6 is sealed between the outer drum shell 21 and the inner drum lid 32 (in conjunction with FIG. 7). Thus, the reliability of sealing among the cyclonic chamber S1, the exhaust chamber S3, the dust collection chamber S2, the connection chamber S4, and associated chambers can be enhanced, and airflow leakage can be reduced, improving the overall operational reliability of the air handling assembly 100 in a simple and effective manner.

A cleaning apparatus 1000 according to embodiments of the present disclosure will be described below with reference to FIGS. 13-15.

Figure 13:
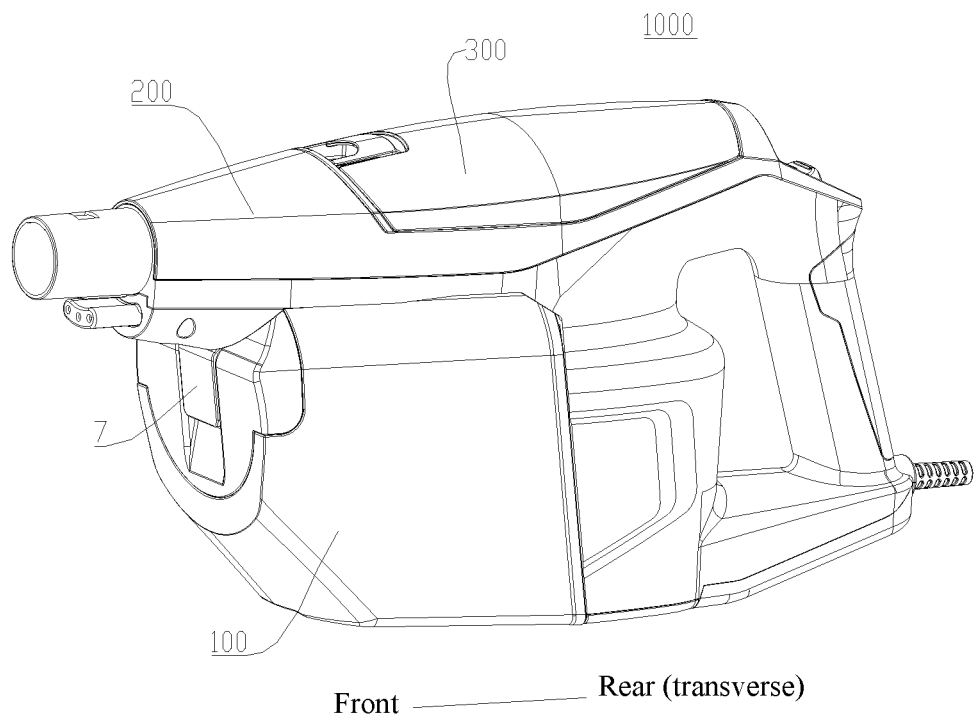
FIG. 13 is a perspective view of a handheld dust collector according to an embodiment of the present disclosure.
Figure 14:
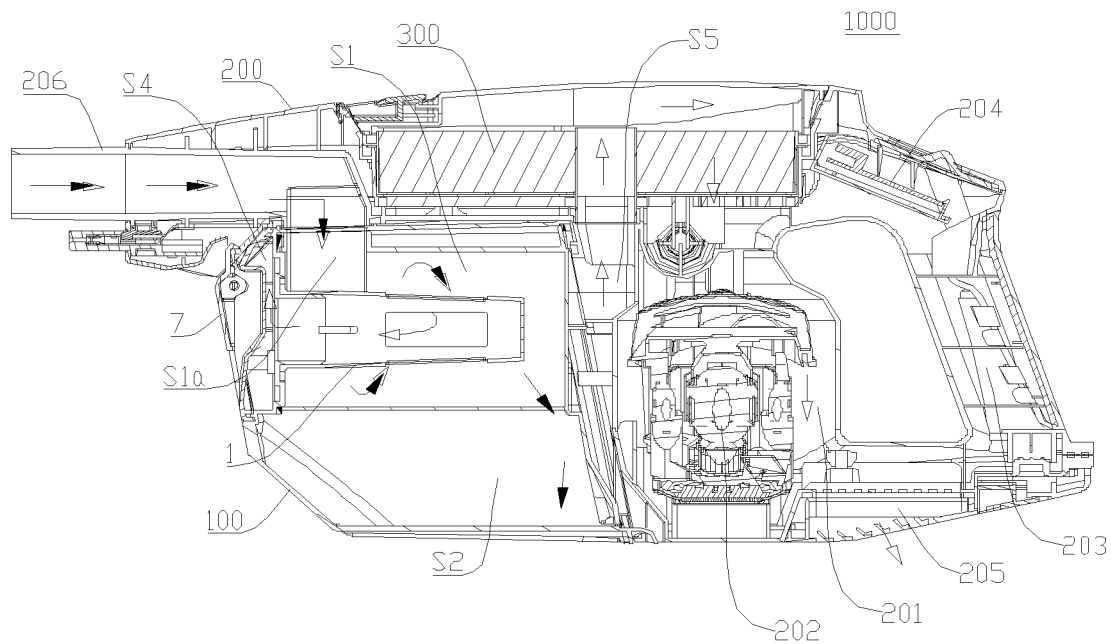
FIG. 14 is a sectional view of the handheld dust collector shown in FIG. 13.
Figure 15:
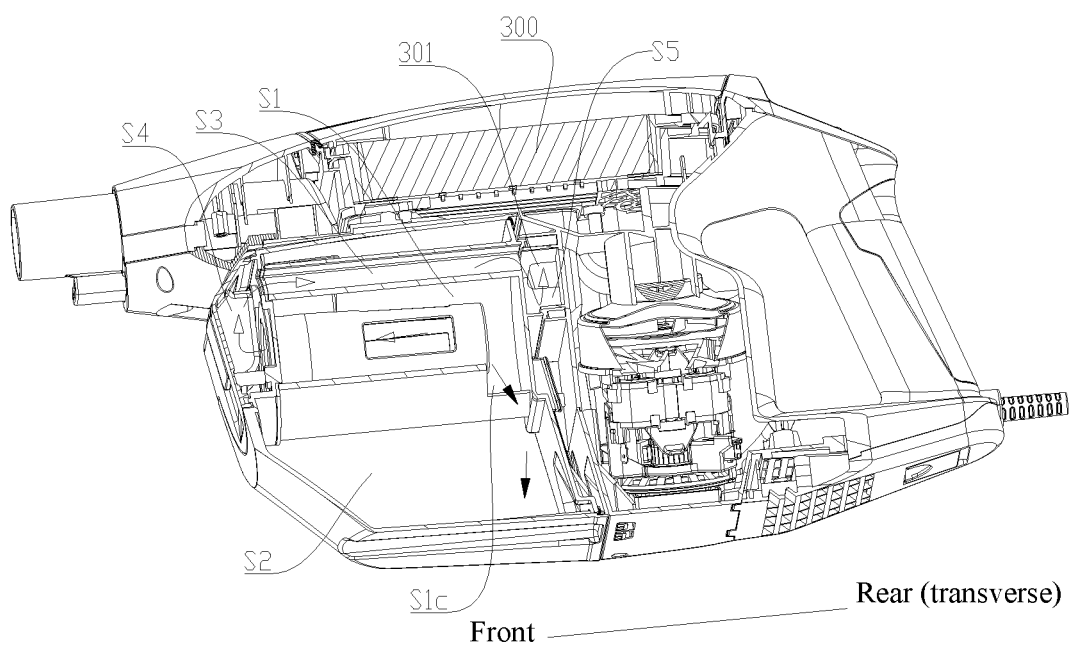
FIG. 15 is another sectional view of the handheld dust collector shown in FIG. 13.

As shown in FIGS. 13-15, the cleaning apparatus 1000 according to the embodiments of the present disclosure may include a body assembly 200 and an air handling assembly 100. The body assembly 200 includes a casing 201 and a suction device 202 arranged within the casing 201. The air handling assembly 100 is arranged on the casing 201 and fluidly connected upstream of the suction device 202, and the air handling assembly 100 is the air handling assembly 100 according to the embodiments of the present disclosure. Thus, the cleaning apparatus 1000 according to the embodiments of the present disclosure is easy to clean.

In one embodiment, the type of the cleaning apparatus 1000 according to the present disclosure embodiment is not limited, that is, the type of the cleaning apparatus 1000 to which the air handling assembly 100 is applied is not limited. For example, the cleaning apparatus may be a handheld dust collector (as shown in FIGS. 13-15), an upright dust collector (not shown), a horizontal dust collector (not shown) or the like. After the type of the cleaning apparatus 1000 is determined, other components and operating principles of the cleaning apparatus 1000 and will not be elaborated here.

As shown in FIGS. 14-15, when the cleaning apparatus 1000 is a handheld dust collector, the body assembly 200 also includes a handle 203 for holding, and the handheld dust collector may also include a pre-filter assembly 300 fluidly connected between the suction device 202 and the air handling assembly 100. That is, when the suction device 202 is in operation, air separated from the air handling assembly 100 can first enter the pre-filter assembly 300 and be filtered again, before flowing to the suction device 202. Hence, the cleanliness of the exhaust air from the handheld dust collector can be reliably improved, and the suction device 202 can be better protected. As shown in FIGS. 14 and 15, the axis of the cyclonic chamber S1 may extend transversely and the pre-filter assembly 300 may be arranged above the air handling assembly 100. Thus, it can be ensured that the handheld dust collector is compact in construction, light to carry and easy to use.

In addition, the assembly relationship between the air handling assembly 100 and the body assembly 200 is not limited. For example, when the cleaning apparatus 1000 is a handheld dust collector, as shown in FIG. 14, the air handling assembly 100 may also include a mounting clasp 7, and the mounting clasp 7 may be arranged on the end cap 4 of the air handling assembly 100 and snapped and locked onto the body assembly 200, to facilitate the mounting and dismounting of the air handling assembly 100 and the body assembly 200. Additionally, when the cleaning apparatus 1000 is the handheld dust collector, the body assembly 200 may also include a switch control device 204 arranged at a top of the handle 203, an exhaust air filter device 205 arranged at a bottom of the handle 203, and a suction tube device 206 arranged upstream of the air handling assembly 100, which will not be described here.

Operation principles of the handheld dust collector according to a specific embodiment of the present disclosure will be described below with reference to FIGS. 14-15.

When the suction device 202 is in operation, dust-laden air outside the handheld dust collector may move to the suction port 211 on the outer drum 2 of the air handling assembly through the suction tube device 206, and enter the cyclonic chamber S1 from the dirty air inlet S1a through a tube portion 313. The airflow undergoes cyclonic separation in the cyclonic chamber S1; separated dirt is discharged into the dust collection chamber S2 through the dust fall opening S1c; separated air enters the airflow passage 1a in the cyclonic cone 1 through the air intake 1b, then is discharged into the connection chamber S4 through the clean air outlet S1b, and enters the exhaust chamber S3 through the inlet S31. The airflow discharged from the outlet S32 of the exhaust chamber S3 enters a temporary storage chamber S5 that is formed between the body assembly 200 and the air handling assembly 100. The airflow discharged into the temporary storage chamber S5 enters the pre-filter assembly 300 through an entrance 301 of the pre-filter assembly 300, and may flow to the suction device 202 after being further filtered by the pre-filter assembly 300 and then be discharged outside the handheld dust collector through the exhaust air filter 205, and realizing cleaning operations.

In the description of the present disclosure, reference to terms "one embodiment," "some embodiments," "an example," "a specific example," "some examples" or the like means that a particular feature, structure, material, or characteristic described in connection with the embodiment or example is included in at least one embodiment or example of the present disclosure. In this specification, the above terms are not necessarily referring to the same embodiment or example. Furthermore, the particular features, structures, materials, or characteristics described may be combined in any suitable manner in any one or more embodiments or examples.

What is claimed is:
1. An air handling assembly, comprising:
a cyclonic chamber having two axial ends as a first end and a second end, and having a clean air outlet on an end face of the first end, a dust fall opening at the second end, and a dirty air inlet between the clean air outlet and the dust fall opening;
a cyclonic cone arranged in the cyclonic chamber and having two axial ends as a third end and a fourth end, the third end and the fourth end being arranged sequentially along a direction from the first end to the second end, the cyclonic cone having an airflow passage within the cyclonic cone and an air intake of the airflow passage on a side wall of the cyclonic cone, the third end being coupled to the first end and communicating the airflow passage with the clean air outlet, and the fourth end being closed and spaced apart from the second end;
a dust collection chamber located outside the cyclonic chamber and being in communication with the dust fall opening; and
an exhaust chamber located outside the cyclonic chamber and being in communication with the clean air outlet, the exhaust chamber being isolated from the dust collection chamber;
wherein an axis of the cyclonic chamber extends transversely and the exhaust chamber extends transversely; and
the exhaust chamber has an inlet extending to the first end and an outlet extending to the second end.

2. The air handling assembly according to claim 1, further comprising:
a connection chamber arranged outside the cyclonic chamber and away from the second end, and connected between the clean air outlet of the cyclonic chamber and the inlet of the exhaust chamber.

3. The air handling assembly according to claim 1, wherein the dirty air inlet is located on a top side of the cyclonic chamber; the dust fall opening is located on a bottom side of the cyclonic chamber; and the dirty air inlet and the dust fall opening are located on two sides of a vertical plane passing through the axis of the cyclonic chamber.

4. The air handling assembly according to claim 1, comprising:
an outer drum comprising:
an outer drum shell arranged transversely and opened at both transverse ends; and
an outer drum lid arranged at one of the transverse ends of the outer drum shell,
wherein the clean air outlet and an inlet of the exhaust chamber are formed on the outer drum lid, and the outer drum shell has a suction port in communication with the dirty air inlet;
an inner drum comprising:
an inner drum shell arranged transversely and inside the outer drum shell, and opened at both transverse ends; and
an inner drum lid arranged at one, away from the outer drum lid, of the transverse ends of the inner drum shell,
wherein the cyclonic chamber and the exhaust chamber are both formed inside the inner drum shell; the dust collection chamber is formed between an inner surface of the outer drum and an outer surface of the inner drum and located below the exhaust chamber; the dirty air inlet is formed on the inner drum shell and close to the outer drum lid; the dust fall opening is formed on the inner drum shell and close to the inner drum lid.

5. The air handling assembly according to claim 4, wherein the inner surface of the outer drum shell has a support rib extending transversely, and the outer surface of the inner drum shell has a lapping rib lapping over the support rib.

6. The air handling assembly according to claim 5, wherein the support rib and the lapping rib lap over each other in a sealing manner and form a sealing surface, and the dust collection chamber is located below the sealing surface.

7. The air handling assembly according to claim 4, further comprising:
an end cap arranged outside the outer drum and on a side of the outer drum lid away from the outer drum shell, the end cap and the outer drum lid defining a connection chamber connected between the clean air outlet and the exhaust chamber.

8. The air handling assembly according to claim 4, wherein the inner drum shell comprises:
a shell portion, the cyclonic chamber being formed within the shell portion, and the dirty air inlet being formed on the shell portion;
a cover portion arranged outside the shell portion, the exhaust chamber being formed between an inner surface of the cover portion and an outer surface of the shell portion; and
a tube portion arranged outside the shell portion and having two ends in communication with the suction port and the dirty air inlet.

9. The air handling assembly according to claim 8, wherein a plurality of cover portions are arranged, and the tube portion penetrates one of the plurality of cover portions.

10. The air handling assembly according to claim 4, wherein the outer drum lid has a mounting portion extending towards an interior of the inner drum shell, and the cyclonic cone is fitted over the mounting portion.

11. The air handling assembly according to claim 4, further comprising:
a first seal sealed between the inner drum shell and the outer drum lid; and/or
a second seal sealed between the outer drum shell and the inner drum lid.

12. A cleaning apparatus, comprising:
a body assembly comprising a casing and a suction device arranged within the casing; and
an air handling assembly arranged on the casing and fluidly connected upstream of the suction device, wherein the air handling assembly comprises:
a cyclonic chamber having two axial ends as a first end and a second end, and having a clean air outlet on an end face of the first end, a dust fall opening at the second end, and a dirty air inlet between the clean air outlet and the dust fall opening;
a cyclonic cone arranged in the cyclonic chamber and having two axial ends as a third end and a fourth end, the third end and the fourth end being arranged sequentially along a direction from the first end to the second end, the cyclonic cone having an airflow passage within the cyclonic cone and an air intake of the airflow passage on a side wall of the cyclonic cone, the third end being coupled to the first end and communicating the airflow passage with the clean air outlet, and the fourth end being closed and spaced apart from the second end;
a dust collection chamber located outside the cyclonic chamber and being in communication with the dust fall opening; and
an exhaust chamber located outside the cyclonic chamber and being in communication with the clean air outlet, the exhaust chamber being isolated from the dust collection chamber;
wherein an axis of the cyclonic chamber extends transversely and the exhaust chamber extends transversely; and
the exhaust chamber has an inlet extending to the first end and an outlet extending to the second end.

13. The cleaning apparatus according to claim 12, wherein the cleaning apparatus is a handheld dust collector, and the body assembly further comprises a handle for holding.

14. The cleaning apparatus according to claim 13, further comprising: a pre-filter assembly fluidly connected between the suction device and the air handling assembly, and the pre-filter assembly is arranged above the air handling assembly.

\* \* \* \* \*